L. M. PASSMORE.
REINFORCEMENT FOR METALLIC TUBING.
APPLICATION FILED MAR. 19, 1908.
908,127.
Patented Dec. 29, 1908.
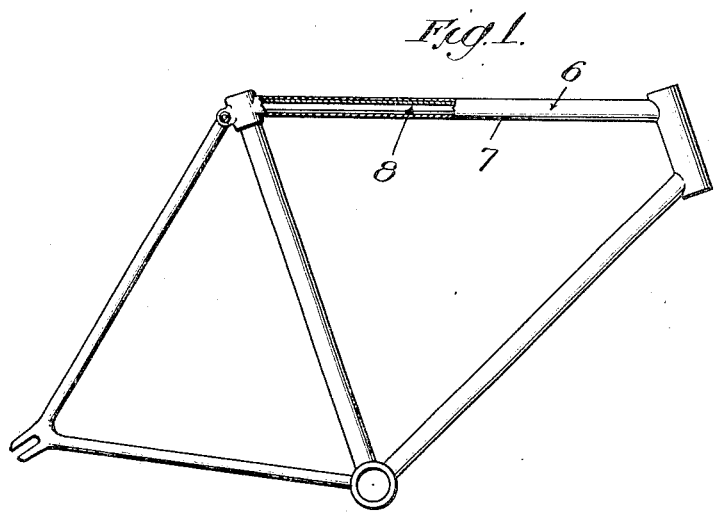
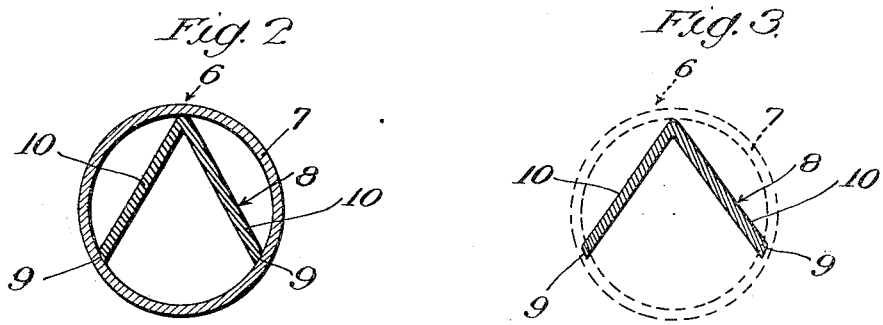
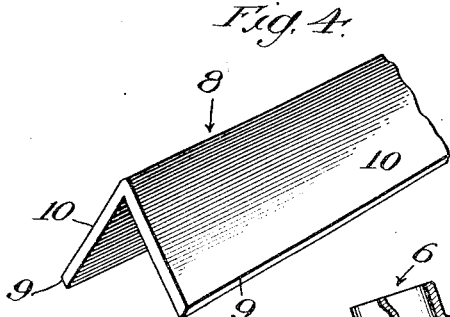
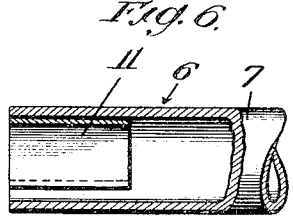
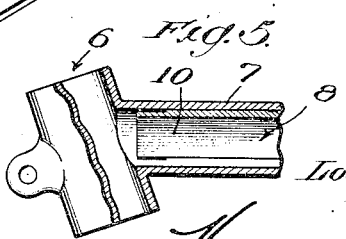

UNITED STATES PATENT OFFICE.

LOUIS M. PASSMORE, OF LOS ANGELES, CALIFORNIA.

REINFORCEMENT FOR METALLIC TUBING.

No. 908,127.      Specification of Letters Patent.      Patented Dec. 29, 1908.

Application filed March 19, 1908. Serial No. 421,971.

*To all whom it may concern:*

Be it known that I, LOUIS M. PASSMORE, a citizen of the United States, residing at Los Angeles, in the county of Los Angeles and State of California, have invented new and useful Improvements in Reinforcements for Metallic Tubing, of which the following is a specification.

My invention relates more specifically to bicycle tubing, and an important object thereof is to provide a reinforcement that will enable a bicycle to withstand unusual longitudinal and transverse strains occasioned by severe shocks and rough usage.

Another object is to provide a removable resilient reinforcement that will at all times and under all conditions maintain its initial position in the tube.

Another object is to provide a reinforcement that will not interfere with the elasticity of the frame to any appreciable extent, and which will not arrest the vibrations imparted to the members of the frame when the bicycle is in use.

A further and essential object is to provide a reinforcement that will eliminate all possibilities of tube crystallization, and which will impart to the frame unusual strength and rigidity that is essential to good bicycle construction.

I accomplish these objects by means of the device described herein and illustrated in the accompanying drawings, in which:—

Figure 1,—is a side elevation of a bicycle frame with parts broken away so as to more clearly disclose my improved reinforcements. Fig. 2,—is a cross-section through a tube showing my reinforcement in place therein. Fig. 3,—is a cross-section through the reinforcement showing its relative size before insertion in a tube, the dotted circles indicating the size of the tube. Fig. 4,—is a perspective view of a portion of my improved reinforcement. Fig. 5,—is a sectional view through the end of a tube showing the method of securing the reinforcement to the ends thereof. Fig. 6,—is a sectional view of the end of a tube showing a modified form of reinforcement.

Referring to the drawings 6 designates a tubular bicycle frame of usual construction and 7 the tubing. Mounted in tubing 7 and extending longitudinally thereof is a metallic reinforcement 8 preferably formed of resilient metal and of such a gage as will meet the varying conditions imposed upon a frame of this character. Reinforcement 8 is preferably bent longitudinally upon itself so as to form an angular member, each leg, 10 of the angle being approximately the same length, so that when inserted in a tube it will equally distribute the strains to all parts. By bending the reinforcement in the center thereof and outwardly beveling the edges 9 I am enabled to insure a perfect contact of the upper and lower edges of the reinforcement along the entire interior peripheral surface of the tube, without resorting to brazing, and thereby reducing the liability of crystallization to the minimum.

As heretofore mentioned the reinforcement is preferably formed from resilient metal, as metal possessing that quality insures the stability of the reinforcement, and when inserted in the tube prevents the shifting from its initial placement. The reinforcement may also be formed from soft tough steel strips that possess enough elasticity to insure its being sustained in its original position. In forming this reinforcement of either a resilient or a non-resilient material the area (as illustrated in Fig. 3) of the angle formed of the bended strips is preferably greater than will permit of easy access to the tube, and prior to insertion the legs 10 of the reinforcement are brought together slightly to permit its being forced or drawn the entire length of the tube. This method of insertion maintains a perfect relation of the edges of the reinforcement with the inner wall or surface of the tube. If a non-resilient metal is utilized the contact edges are brazed near each end for a slight distance, but even this is considered unnecessary as the configuration of the reinforcement will insure its initial position under all ordinary conditions.

In Fig. 6 of the drawings I have illustrated a modified form of reinforcement which does not extend the entire length of the tube, as is illustrated and described in the preferred form but is composed of a short length 11 of an angular configuration and is brazed on its three edges to the ends of the tube, thus minimizing the liability of the tube "buckling" at its ends, the points at which this trouble usually occurs.

It will be observed that by forming this reinforcement of an angular configuration and inserting it the entire length of the tube I am enabled to provide a frame of unusual strength and rigidity without materially increasing the weight.

Having described my invention what I claim as new and desire to secure by Letters Patent is:—

1. The combination of a tube with a resilient reinforcing member adapted for longitudinal placement within the tube, said member having an apex portion, leg portions extending outwardly from the apex portion and making angles with each other, the length of said member between the extremities of the legs being greater before insertion in the tube than after insertion whereby the edges of the member bear against the inside of the tube.

2. The combination of a tube with a resilient reinforcing member adapted for longitudinal placement within the tube, said member having an apex portion bearing against the inside of the tube, leg portions extending from said apex portion and making an angle with each other, the distance between the extremities of the legs being greater before insertion in the tube than after insertion, whereby the edges of the member bear against the inside of the tube.

3. The combination of a tube with a reinforcement therefor, said reinforcement comprising a resilient metallic member of a general V-shaped cross-section and adapted for placement in the tube, the angle and the length of the legs of said member being such as to prevent its entrance into the tube until the legs of the angle are slightly brought together, whereby the edges of the reinforcement will form a continuous bearing contact with the inner peripheral surface of the tube.

4. The combination of a tube with a resilient reinforcing member adapted for longitudinal placement within the tube, said member having an apex portion bearing against the inside of the tube, leg portions extending from said apex portion and making an angle with each other, the distance between the extremities of the legs being greater before the insertion in the tube than after insertion, whereby the edges of the member bear against the inside of the tube, the reinforcing member being secured against longitudinal displacement in the tube by being secured at its ends to the inner walls of the tube.

5. The combination of a tube with a resilient reinforcing member adapted for placement within and to extend longitudinally of the tube, said member having an apex portion, leg portions extending outward from the apex portion and making angles with each other, the length of said member from the extremity of one leg to the extremity of the other before its insertion into the tube being greater than the length of the same dimension after the said member is inserted into the tube, whereby the edges of the member bear continuously throughout the entire length of the tube.

In witness that I claim the foregoing I have hereunto subscribed my name this 13th day of March, 1908.

L. M. PASSMORE.

Witnesses:
  Edmund A. Strause,
  Ollie Palmer.